United States Patent
Mukherjee et al.

(10) Patent No.: US 9,678,796 B2
(45) Date of Patent: Jun. 13, 2017

(54) METHODS AND SYSTEMS FOR DETERMINING COMPUTATIONAL RESOURCE REQUIREMENT

(71) Applicant: XEROX CORPORATION, Norwalk, CT (US)

(72) Inventors: Tridib Mukherjee, Bangalore (IN); Sujit Gujar, Pune (IN); Shruti Kunde, Mumbai (IN)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 14/807,918

(22) Filed: Jul. 24, 2015

(65) Prior Publication Data
US 2017/0024256 A1    Jan. 26, 2017

(51) Int. Cl.
*G06F 9/46* (2006.01)
*G06F 9/50* (2006.01)

(52) U.S. Cl.
CPC .................. *G06F 9/5005* (2013.01)

(58) Field of Classification Search
None
See application file for complete search history.

(56) References Cited

U.S. PATENT DOCUMENTS

| | | |
|---|---|---|
| 8,225,319 B2 | 7/2012 | Laithwaite et al. |
| 2009/0183168 A1* | 7/2009 | Uchida ............... G06F 9/5027 718/104 |
| 2010/0205049 A1* | 8/2010 | Long ..................... G06Q 30/02 705/14.5 |
| 2012/0072762 A1 | 3/2012 | Atchison et al. |
| 2012/0131591 A1 | 5/2012 | Moorthi et al. |
| 2013/0218814 A1 | 8/2013 | Kang et al. |
| 2013/0268944 A1* | 10/2013 | Fellenstein ............... G06F 8/61 718/104 |
| 2014/0164618 A1 | 6/2014 | Alicherry et al. |

OTHER PUBLICATIONS

"CrowdMAC: A Crowdsourcing System for Mobile Access", Do Ngoc, Hsu Cheng-Hsin and Venkatasubramanian Nalini. Middleware 2012, pp. 1-20.

(Continued)

*Primary Examiner* — Lewis A Bullock, Jr.
*Assistant Examiner* — Melissa Alfred

(57) ABSTRACT

A method and system to determine a computational resource requirement is described. The method and system rank one or more computational resources for each of the plurality of tasks in an ascending order, based on a cost associated with the plurality of tasks for each of the computational resource. Based on the ranked one or more computational resources and a fairness metric, the method and system allocates the one or more capacity units associated with the computational resource to perform the plurality of tasks. The method and system determines the computational resource requirement to perform the plurality of tasks based on the allocated one or more capacity units. The fairness metric ensures that allocation of the one or more capacity units to the plurality of tasks is performed in a manner to maximize the fairness.

22 Claims, 9 Drawing Sheets

(56) References Cited

OTHER PUBLICATIONS

Y. Narahari, C.V.L. Raju, K. Ravikumar, and Sourabh Shah. Dynamic Pricing Models for Electronic Business. Sadhana (Special Issue on Electronic Commerce and Electronic Business), vol. 30, Parts 2 and 3, Apr./Jun. 2005, pp. 231-255.

"Market-Oriented Cloud Computing: Vision, Hype, and Reality for Delivering IT Services as Computing Utilities", Rajkumar Buyya, Ghee Shin Yeo, and Srikumar Venugopal. High Performance Computing, 2008.

Sonja Lehmann and Peter Buxmann. Pricing Strategies of Software Vendors. Business & Information Systems Engineering, vol. 1(6), 2009, pp. 452-462.

"SLA-based admission control for a Software-as-a-Service provider in Cloud computing environments", Linlin Wu, Saurabh Kumar Garg, Rajkumar Buyya, Journal of Computer and System Sciences. Elsevier 2012.

\* cited by examiner

METHODS AND SYSTEMS FOR DETERMINING COMPUTATIONAL RESOURCE REQUIREMENT

TECHNICAL FIELD

The presently disclosed embodiments relate in general to a distributed computing environment. More particularly, the presently disclosed embodiments relate to a methods and systems for determining computational resource requirement for performing a plurality of tasks.

BACKGROUND

Distributed computing refers to a computing network in which one or more interconnected computing devices co-operate with each other by sharing one or more computational resources (e.g., instances of CPUs, RAM, disk-space, etc.). One of the types of distributed computing is volunteer computing in which resource providers having one or more resource types voluntarily share the computational resources for performing a task. For example, the resource providers can help certain tasks that require high levels of processing power and memory usage by sharing the computational resources, when the computing devices associated with these resource providers are in an idle state.

Sharing of computing resources among peers has gained increased attention from the research community over the years. Recent efforts have looked into marketplace offerings to allow commoditizing of resources. Currently, if a user wants to utilize the shared computing resources, then the user has to provide exact resource requirement for computing one or more tasks. Thus, the burden of providing resource requirement is on the user.

SUMMARY

According to embodiments illustrated herein, there is provided a method to allocate computational resources to a plurality of tasks. The method ranks one or more computational resource types for each of the plurality of tasks, based on at least a cost of a capacity unit of each of the one or more computational resources associated with each of the one or more computational resource types. The method further allocates, to each of the plurality of tasks, the capacity unit of the one or more computational resources associated with a computational resource type, from the respective one or more ranked computational resource types based on an availability of the one or more computational resources and a rank of the computational resource type. The method allocates the capacity units until a pre-defined performance demand of each of the plurality of tasks is met.

According to embodiments illustrated herein, there is provided a method to allocate computational resources to a plurality of tasks. The method ranks one or more computational resource types for each of the plurality of tasks, based on at least a cost of each of the one or more computational resources associated with each of the one or more computational resource types. The method further iteratively allocates to a task from the plurality of tasks, a capacity unit of a highest ranked computational resource type, from the respective one or more ranked computational resource types, until a performance demand of the task is met.

According to embodiments illustrated herein, there is provided a method to determine a computational resource requirement. The method registers a plurality of computational resources with one or more computational resource types in a repository. Each of the plurality of computational resources are associated with a capacity vector. The method determines a capacity unit for each of the one or more computational resource types based on the capacity vector. The method further receives a request for determining a computational resource requirement for performing plurality of tasks based on a pre-defined performance demand associated with each of the plurality of tasks. The method further ranks one or more computational resource types for each of the plurality of tasks in an ascending order, based on a cost associated with the plurality of tasks for each of the computational resources associated with each of the one or more computational resource types. The method allocates the one or more capacity units required to perform the plurality of tasks based on the ranked one or more computational resources types and a fairness metric. The fairness metric ensures that allocation of the one or more capacity units to the plurality of tasks is performed in a manner to maximize a fairness. Based on the allocated one or more capacity units, the method determines the computational resource requirement to perform the plurality of tasks.

According to embodiments illustrated herein, there is provided a system to allocate computational resources to plurality of tasks. The system comprises of one or more processors operable to rank one or more computational resource types for each of the plurality of tasks, based on at least a cost of a capacity unit associated with each of the one or more computational resources associated with each of the one or more computational resource types. The one or more processors are further operable to allocate to each of the plurality of tasks, the capacity unit of a highest ranked computational resource type, from the respective one or more ranked computational resource types, until a pre-defined performance demand of each of the plurality of tasks is met.

According to embodiments illustrated herein, there is provided a system to allocate computational resources to plurality of tasks. The system comprises of one or more processors operable to rank one or more computational resource types for each of the plurality of tasks, based on at least a cost of each of the one or more computational resources for each of the plurality of tasks. The one or more processors are further operable to allocate, iteratively to a task from the plurality of tasks, a capacity unit of a highest ranked computational resource type, from the respective one or more ranked computational resource types, until a performance demand of the task is met.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
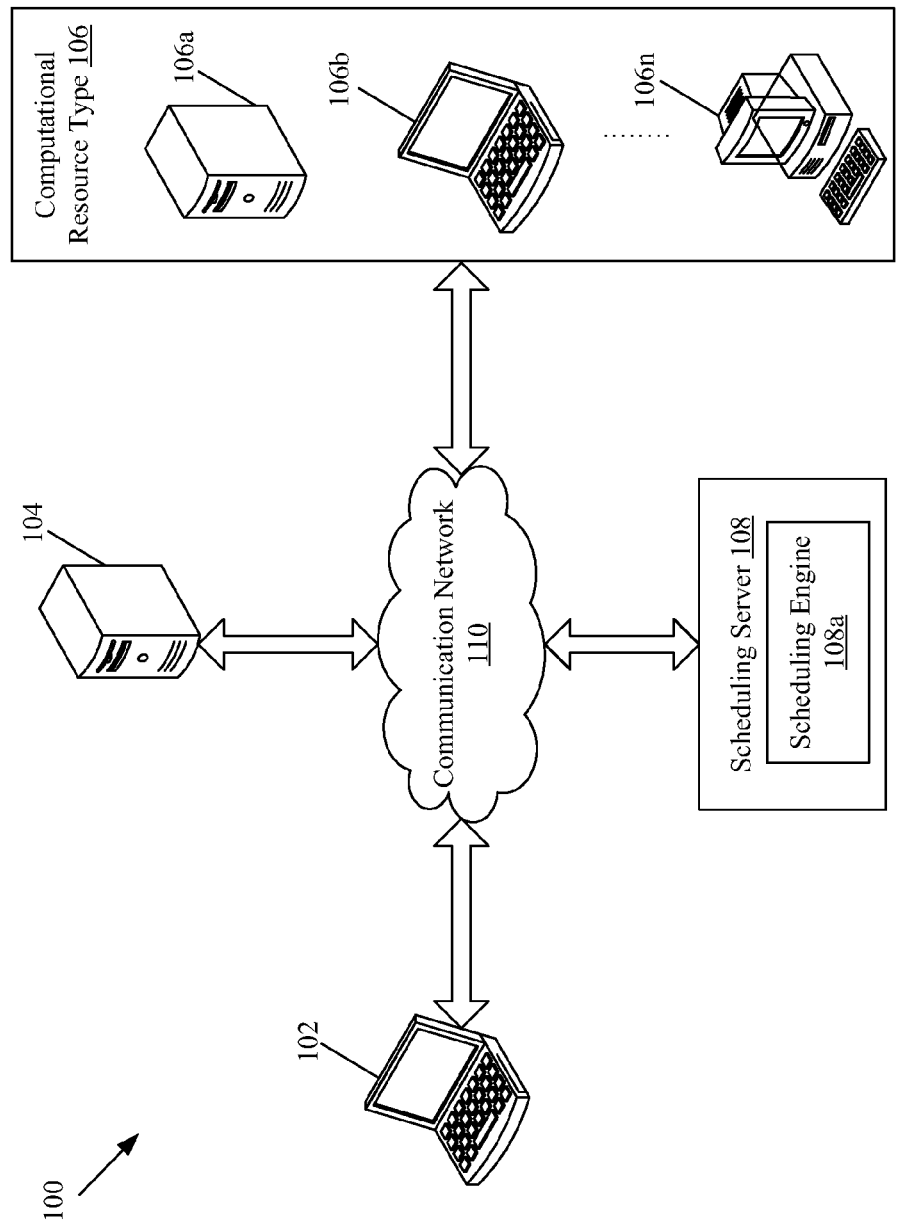
FIG. 1 is a block diagram illustrating a system environment to determine computational resource requirement for performing one or more tasks, in accordance with an embodiment of the disclosure.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "computational resource type" refers to a device that includes a processor/microcontroller and/or any other electronic component, or a device or a system that performs one or more operations according to one or more programming instructions. Examples of the computational resource type include, but are not limited to, a desktop computer, a laptop, and/or a server. In an embodiment, one or more resource requesters may utilize the one or more resource types.

A "computational resource" refers to one or more computational resources associated with the one or more computational resource types, required for performing a task. Examples of computational resources include, but are not limited to, a processor, a memory, a disk space, and/or a GPU processor.

The "distributed computing network" refers to a computing network, in which one or more computational resource types share respective computational resources for performing the task. Hereinafter, the terms "distributed computing network", "volunteer computing network", and "computing network", are used interchangeably.

The "task" refers to an application or software that a resource requester may want to perform. The resource requester may request for one or more computational resources for performing the task. Each task may have different computational resource requirement. For example, task 1 may be a big data application that is disk space intensive, thereby requiring more disk space resource. Whereas task 2 may be a map-reduce application that is compute intensive and thus requires more number of processors.

The "resource requester" may refer to one or more computing devices that may require one or more computational resources to perform the task. In an embodiment, the resource requester may transmit a request to the distributed computing network for performing the task. In an embodiment, the request may include a performance demand associated with the task. The resource requestor may transmit the request to the requirement translation device. In an embodiment, the resource requester realizes through various computing devices, such as a desktop, a laptop, a personal digital assistant (PDA), a tablet computer, and the like.

A "computational resource requirement" refers to a capacity of computational resources required by the resource requester for performing the task. In an embodiment, the computational resource requirement of the one or more computational resources is measured in one of Giga Instructions per second (GIPS), and Giga bytes (GB).

A "capacity vector" refers to a representation of a capacity of computational resources of a computational resource type. In an embodiment, the capacity vector may represent capacity of individual computational resources, for example, compute, memory, and storage. An example of a capacity vector is <2 GHz, 2 CPUs, 2 GB, 100 GB>.

A "capacity unit" of a computational resource type refers to a smallest computational unit capable of contributing to perform a task. In an embodiment, the capacity unit of a computational resource type may be determined by determining the greatest common factor of capacity of each computational resource across all the registered computational resources associated with each of the computational resource types. For example, if there are two computational resources with capacity vectors <2 GHz, 2 CPUs, 2 GB, 100 GB> and <4 GHz, 1 CPU, 8 GB, 60 GB>, then the capacity unit is <2 GHZ, 1 CPU, 2 GB, 20 GB>.

A "performance value" refers to performance of each task on capacity unit of each resource type. A task $T_j$ when performed on a resource type $r_i$ with capacity unit $C_u(i)<>$, the performance achieved would be $P_u(j, i)$. In an embodiment, the performance value for each of the one or more computational resources is determined by utilizing one or more benchmarking techniques.

A "cost" $E_u(j, i)$ associated with each of the one or more tasks such as corresponds to an amount, either monetary or non-monetary, incurred by the user of a resource requestor for getting a task $T_j$ performed in the distributed computing environment. In an embodiment, the cost of a task is determined for the capacity unit of computational resource type $r_i$. In an embodiment, the cost for each of the one or more computational resources is determined by utilizing one or more benchmarking techniques. Examples of the non-monetary cost incurred by the resource requestor may include, but are not limited to, network/bandwidth cost. In an embodiment, the cost can represent a monetary cost incurred by the resource requestor.

A "performance demand" represents a high-level granularity of computational resource requirement specified by the resource requestor. Each task is associated with a performance demand. The performance demand may be represented as Dj for a task j. In an embodiment, the resource requestor may mention the performance demand in terms of high performance, medium performance, or low performance.

A "high-level granularity of computational resource requirement" refers to the computational resource requirement specified by the resource requestor for performing a task. The computational resource requirement with the high-level granularity are expressed in terms of high performance, medium performance, or low performance.

A "low-level granularity of computational resource requirement" refers to the exact computational resource requirement for performing plurality of tasks. Examples of low-level granularity of computational resource requirement for performing a task can be illustrated as <2 CPU's, 3 GB RAM, 100 GB HDD>.

A method for allocating computational resources to plurality of tasks is described. The method ranks one or more computational resource types for each of the plurality of tasks based on at least a cost of a capacity unit associated with each of the one or more computational resources. Based on the ranking, the method allocates to each of the plurality of tasks, the capacity unit of a computational resource, from the respective one or more ranked computational resource types based on an availability of the computational resource type and a rank of the computational resource type, until a pre-defined performance demand of each of the plurality of tasks is met.

In an embodiment, the method receives information pertaining to the one or more computational resources from one or more computational resource types. The information comprises an Internet Protocol (IP) address of the computational resource type, and a capacity vector of each of the one or more computational resources. In an embodiment, the method determines the capacity unit based on a greatest common factor of the one or more capacity vectors associated with the one or more computational resources. In an embodiment, the method determines a number of capacity units required for performing plurality of tasks. In an embodiment, the method further determines a performance value of each of the plurality of tasks by utilizing one or more benchmarking techniques. In an embodiment, the method further determines the cost for each of the one or more computational resources by utilizing one or more benchmarking techniques. The cost comprises at least network/bandwidth cost associated with the respective computational resource. The method further determines a computational resource requirement of each of the plurality of tasks based on a count of allocated capacity units of a computational resource type. The method further determines an upper limit of a number of computational resources that may be allocated to a task from the one or more tasks.

A method for allocating computational resources to plurality of tasks is described. The method ranks one or more computational resources for each of the plurality of tasks, based on at least a cost of each of the one or more computational resources for each of the plurality of tasks. Subsequently, the method allocates, iteratively to a task from the plurality of tasks, a capacity unit of a highest ranked computational resource type, from the respective one or more ranked computational resources, until a performance demand of the task is met.

A method to determine a computational resource requirement is described. A plurality of computational resources with one or more computational resource types are registered in a repository. Each of the plurality of computational resources are associated with a capacity vector. A capacity unit for each of the one or more computational resource types is determined based on the capacity vector. In an embodiment, the capacity unit is computed by determining a greatest common factor of the one or more capacity vectors associated with the one or more computational resources. A request for determining a computational resource requirement for performing plurality of tasks based on a pre-defined performance demand associated with each of the plurality of tasks is received. The method ranks one or more computational resource types for each of the plurality of tasks in an ascending order, based on a cost associated with the plurality of tasks for each of the computational resource type. Based on the ranked one or more computational resource types and a fairness metric, allocation of the one or more capacity units required to perform the plurality of tasks is done. The fairness metric ensures that allocation of the one or more capacity units to the plurality of tasks is performed in a manner to maximize the fairness. Based on the allocated one or more capacity units, the computational resource requirement to perform the plurality of tasks is determined.

A system to allocate computational resources to plurality of tasks is described. The system implements the steps using one or more processors. The processor ranks one or more computational resource types for each of the plurality of tasks based on at least a cost of a capacity unit associated with each of the one or more computational resources. Based on the ranking, the processor allocates to each of the plurality of tasks, the capacity unit of a highest ranked computational resource type, from the respective one or more ranked computational resource types, until a pre-defined performance demand of each of the plurality of tasks is met.

A system to allocate computational resources to plurality of tasks is described. The system implements the steps using one or more processors. The processor ranks one or more computational resource types for each of the plurality of tasks, based on at least a cost of each of the one or more computational resources for each of the plurality of tasks. The processor iteratively allocates to a task from the plurality of tasks, a capacity unit of a highest ranked computational resource type, from the respective one or more ranked computational resource types, until a performance demand of the task is met.

A system to allocate computational resources to plurality of tasks is described. The system implements the steps using one or more processors. The processor registers a plurality of computational resources with one or more computational resource types in a repository. Each of the plurality of computational resources are associated with a capacity vector. The processor determines a capacity unit for each of the one or more computational resource types based on the capacity vector. A request is received for determining a computational resource requirement for performing plurality of tasks based on a pre-defined performance demand associated with each of the plurality of tasks. The processor ranks one or more computational resource types for each of the plurality of tasks in an ascending order, based on a cost associated with the plurality of tasks for each of the computational resource type. Subsequently, the processor allocates the one or more capacity units required to perform the plurality of tasks based on the ranked one or more computational resource types and a fairness metric. The fairness metric ensures that allocation of the one or more capacity units to the plurality of tasks is performed in a manner to maximize the fairness. The processor determines the computational resource requirement to perform the plurality of tasks based on the allocated one or more capacity units.

FIG. 1 is a block diagram illustrating a system environment 100 to determine computational resource requirement for performing one or more tasks, in accordance with an embodiment of the disclosure. With reference to FIG. 1, there is shown a resource requestor 102, a requirement translation device 104, a plurality of computational resource types 106, a scheduling server 108, and a communication network 110.

The resource requestor 102 refers to one or more computing devices that require one or more computational resources to perform one or more tasks. In an embodiment, the resource requester 102 may transmit a request to the requirement translation device 104 for the one or more computational resources, via the communication network 110. In an embodiment, the request may include information pertaining to a performance demand associated with the task. In an embodiment, the resource requester 102 may be realized through various computing devices, such as a desktop, a laptop, a personal digital assistant (PDA), a tablet computer, and the like. In an embodiment, the resource requestor 102 may include one or more processors and one or more memory devices comprising one or more instructions that are executable by the one or more processors to perform predetermined operations. In an embodiment, the one or more processors and the one or more memory devices are not capable for performing the task with a required performance demand of the resource requestor 102.

The requirement translation device 104 comprises suitable logic, circuitry, interfaces, and/or code that are operable to translate the high-level granularity of computational resource requirement into a low-level granularity of computational resource requirement. The low-level computational resource requirement mentions exact computational resource requirement for performing plurality of tasks. The requirement translation device 104 is operable to rank the one or more computational resource types 106 for performing plurality of tasks. The requirement translation device 104 is further operable to ensure fairness in allocation of one or more ranked computational resource types to the plurality of tasks. The requirement translation device 104 is further operable to determine the low-level granularity of computational resource requirement based on the allocation of the one or more ranked computational resource types to the plurality of tasks. The requirement translation device 104 translates the plurality of tasks' performance demands into numbers and computational resources required for performing the plurality of tasks. In an embodiment, the requirement translation device 104 may be implemented using an application server. Some examples of the application server may include, but are not limited to, BASE4 application server, JAVA application server, etc.

The plurality of computational resource types 106 comprises one or more computing devices that include a processor/microcontroller and/or any other electronic component, or a device or a system that performs one or more operations according to one or more programming instructions. Examples of the computational resource type 106 include, but are not limited to, a server 106a, a laptop 106b, and/or a server 106n. In an embodiment, the owners of the plurality of computational resource types 106 may share the one or more computational resources associated with respective resource types to the one or more resource requesters 102, through the requirement translation device 104, to perform plurality of tasks. In an embodiment, if the one or more computational resources associated with the computational resources types are idle, then the idle resources are shared for performing the plurality of tasks. In an embodiment, plurality of computational resource types 106 may transmit a message to the requirement translation device 104 comprising a list of one or more idle computational resources. Further, the message may include information pertaining to the duration for which the one or more computational resource are available for sharing.

A scheduling server 108 comprises suitable logic, circuitry, interfaces, and/or code that are operable to schedule the required computational resources for timely completion of the plurality of tasks. The scheduling server 108 may further comprise of a scheduling engine 108a. The scheduling engine 108a receives input of the computational resource requirement from the requirement translation device 104 and schedules (e.g., availability of the one or more computational resources) of the one or more required computational resources for performing the plurality of tasks. The scheduling engine 108a is operable to schedule the computational resources for performing the plurality of tasks within a pre-defined time. In an embodiment, the scheduling engine 108a schedules the computational resources based on individual estimation of performance of the plurality of computational resource types 106.

The communication network 110 may include a medium through which the requirement translation device 104, the one or more resource requestors 102, the resource types 102, the scheduling server 108 may exchange messages/data/information. Such a communication is performed, in accordance with various wired and wireless communication protocols. Examples of such wired and wireless communication protocols may include, but are not limited to, Transmission Control Protocol and Internet Protocol (TCP/IP), User Datagram Protocol (UDP), 2G communication protocol, 3G communication protocol, 4G communication protocol, Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols. The communication network 110 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
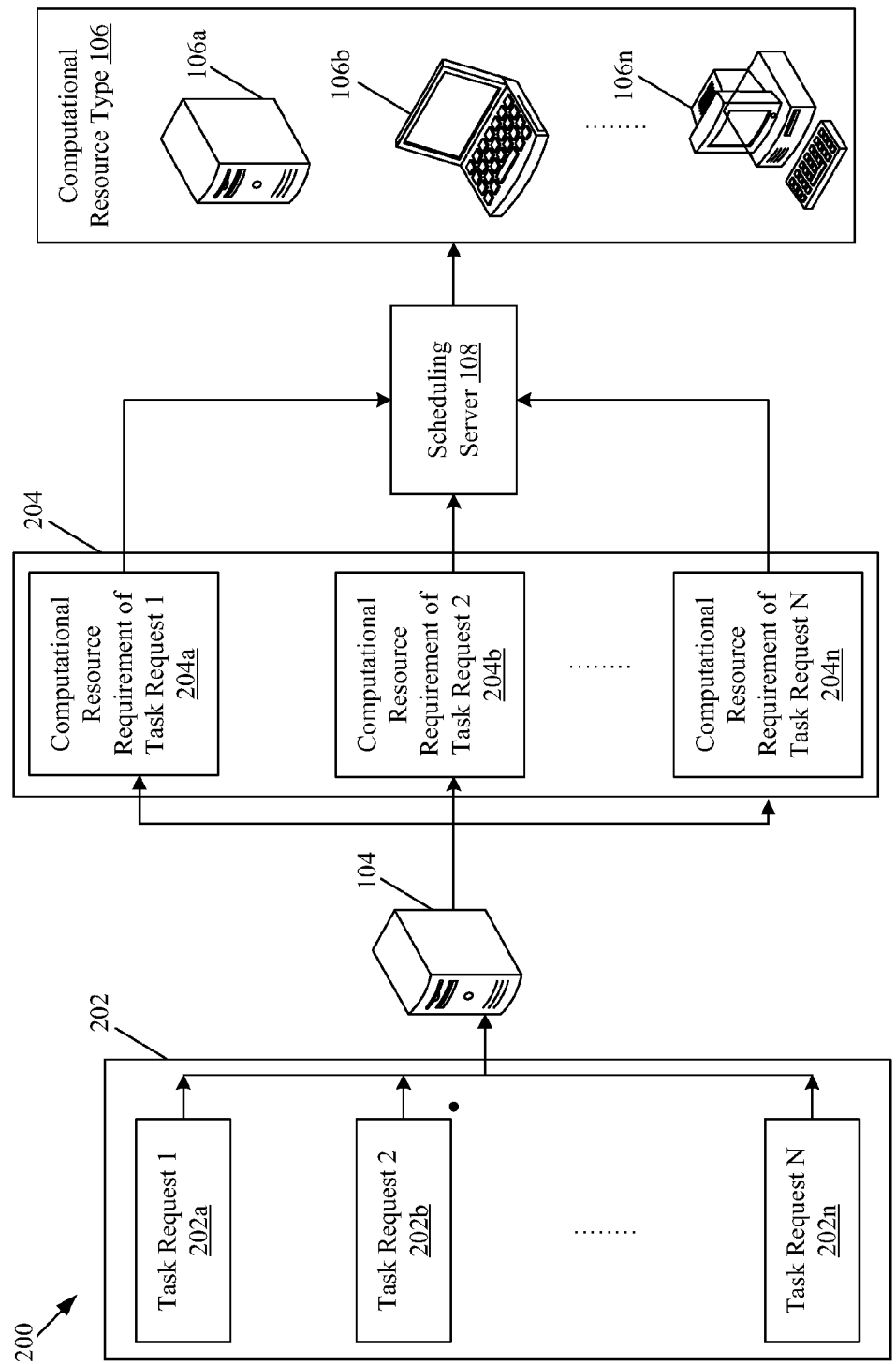
FIG. 2 is a functional system environment diagram to determine computational resource requirement for performing one or more tasks, in accordance with an embodiment of the disclosure.

FIG. 2 is a functional system environment 200 to determine the computational resource requirement for performing one or more tasks, in accordance with an embodiment of the disclosure. FIG. 2 is explained in conjunction with elements from FIG. 1. With reference to FIG. 2, there are shown a plurality of task requests 202 (that may be received from the resource requestor 102), the requirement translation device 104, a computational resource requirement 204, the scheduling server 108, the plurality of computational resource types 106. The requirement translation device 104 may receive the plurality of task requests 202 and the information pertaining to the plurality of the computational resource types 106, via the communication network 110.

The plurality of task requests 202 comprises information pertaining to the computational resource requirement 204 at a high-level of granularity. The requirement translation device 104 receives the plurality of task requests 202 from the one or more resource requestors 102. Examples of plurality of task requests 202 may include task request 1 202a, task request 2 202b, up to task request n 202n as shown in FIG. 2. A task request such as task request 1 202a contains a performance demand expected by the resource requestor 102 for performing a task 1. For example, the task request 1 202a mentions that the resource requestor 102 requires either of a high, medium, or low performance for performing the task 1. Thus, the resource requestor 102 mentions the computational resource requirement with the high-level granularity in terms of high, medium, or low.

The computational resource requirement 204 corresponds to the low-level granularity of computational resource requirement 204 required to process each task in the plurality of tasks. As shown in FIG. 1 204a, 204b, up to 204n represent a computational resource requirement 204 for the task request 1 202a, the task request 2 202b, up to the task request n 202n, respectively. In an embodiment, the requirement translation device 104 converts the high-level requirement of the one or more computational resource to the low-level requirement.

In operation, the requirement translation device 104 receives a request from plurality of computational resource types 106 to register their respective one or more computational resources. In an embodiment, the registered one or more computational resources may be used for performing the plurality of task requests. The plurality of computational resource types 106 sends the request to the requirement translation device 104, via a communication network 110. During registration, the requirement translation device 104 creates static and dynamic classes for each of the registered plurality of computational resources. The requirement translation device 104 creates the static and dynamic classes based on the computational resources of each computational resource types 106. The requirement translation device 104 considers the availability and behavioral pattern mining of the computational resources while classifying the one or more computational resources under the static and dynamic classes. In an embodiment, the requirement translation device 104 performs analyses of historical performance of the computational resources in order to classify the computational resources.

The resource requestor 102 transmits the plurality of task requests 202 to the requirement translation device 104, via the communication network 110. Each of the plurality of task requests 202 contain computational resource requirement information pertaining to corresponding plurality of tasks. Let the performance demand be represented as Dj for each of the plurality of tasks requests, where j corresponds to $j^{th}$ task from the plurality of tasks requests. The computational resource requirement information transmitted by the resource requestor 102 is a high-level granularity of computational resource requirement. The requirement translation device 104 is operable to translate the high-level granularity of computational resource requirement to a low-level granularity of computational resource requirement.

For translating the resource requirement from high-level granularity of computational resource requirement to low-level granularity of computational resource requirement, the requirement translation device 104 determines a capacity vector C(i) and a capacity unit Cu(i) associated with each computational resource type. In an embodiment, the capacity vector corresponds to a capacity of the one or more computational resources associated with the computational resource type. Each task Tj has an associated performance demand $D_j$. Further, for each task, the cost incurred by the resource requestor 102 to execute task $T_j$ on each of the resource type is determined. In an embodiment, requirement translation device 104 considers a benchmarking information and/or a historical performance of each of the computational resource types 106 for performing a task. In an embodiment, the historical performance may include the information pertaining to the performance of a task (of same type to that of the task from the plurality of tasks under consideration) on each of the one or more computational resources for each of the computational resource type, such as 106a, 106b or 106n.

In an alternate embodiment, the requirement translation device 104 may utilize the one or more benchmarking techniques to determine the cost. In such an embodiment, the requirement translation device 104 may perform the task by utilizing one or more capacity units of the one or more computational resources associated with each of the computational resource type, such as 106a. In an embodiment, the cost can represent a monetary cost incurred by the resource requestor 102. In another embodiment, the cost can represent a non-monetary cost incurred by the resource requestor 102. Examples of the non-monetary cost incurred by the resource requestor 102 may include, but are not limited to, network/bandwidth cost.

The performance demand $D_j$ and the cost of each task (on each computational resource type 106) is provided as input to the requirement translation device 104. In response to the input, the requirement translation device 104 ranks the plurality of computational resource types 106 for each of the plurality of tasks based on the cost. Based on the ranking of the plurality of the computational resource types 106, the requirement translation device 104 allocates the one or more capacity units associated with each resource type to the plurality of tasks.

The requirement translation device 104 is operable to ensure fairness in allocation of capacity units of a computational resource type to a task. In an embodiment, requirement translation device 104 uses a FREQUENT heuristic solution to allocate one or more capacity units of a computational resource type to the plurality of tasks. In another embodiment, the requirement translation device 104 uses a Fast-FREQUENT heuristic solution to allocate one or more capacity units of a computational resource type to the plurality of tasks. The selection of using the FREQUENT heuristic solution or the Fast-FREQUENT heuristic solution for generating the low-level granularity of computational resource requirement is dependent on an input from the resource requestor 102. The resource requestor 102 may select the FREQUENT heuristic solution if the user needs a highly scalable and highly fair while performing the plurality of tasks. In an embodiment, the resource requestor 102 may select the Fast-FREQUENT heuristic solution if the user needs a high performance while performing the plurality of tasks. Based on the allocation of the one or more capacity units of a computational resource type using either the FREQUENT heuristic solution or the Fast-FREQUENT heuristic solution, the requirement translation device 104 generates an output of the low-level granularity of computational resource requirement.

After the translation of the computational resource requirement from the high-level granularity of computational resource requirement to the low-level granularity of computational resource requirement, the scheduling engine 108a ensures timely completion of the plurality of tasks. The output of the requirement translation device 104 is provided as input to the scheduling engine 108a. The scheduling engine 108a schedules the one or more required resources for performing the one or more tasks based on individual estimation of performance of the one or more resources.

Figure 3:
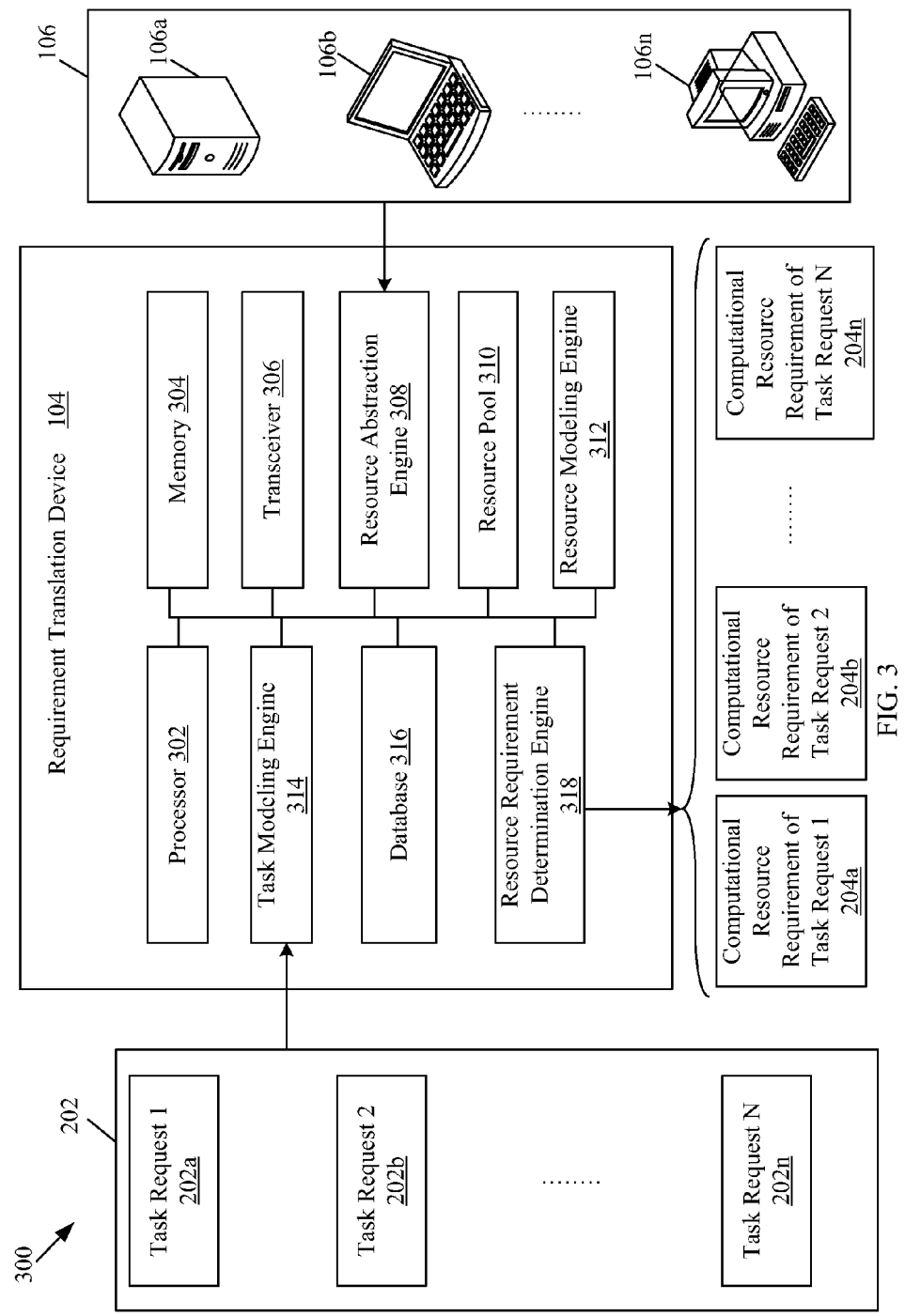
FIG. 3 is a block diagram illustrating the various components of a requirement translation device, in accordance with an embodiment of the disclosure.

FIG. 3 is a block diagram 300 illustrating the various components of a requirement translation device 104, in accordance with an embodiment of the disclosure. FIG. 3 is explained in conjunction with elements from FIG. 1 and FIG. 2. With reference to FIG. 3, there is shown a processor 302, a memory 304, a transceiver 306, a resource abstraction engine 308, a resource pool 310, a resource modeling engine 312, a task modeling engine 314, a database 316, and a resource requirement determination (RRD) engine 318.

The processor 302 may comprise suitable logic, circuitry, interfaces, and/or code that may be operable to execute a set of instructions stored in the memory 304. The processor 302 may be implemented based on a number of processor technologies known in the art. Examples of the processor 302 may be an X86-based processor, a Reduced Instruction Set Computing (RISC) processor, an Application-Specific Integrated Circuit (ASIC) processor, a Complex Instruction Set Computing (CISC) processor, and/or other processor.

The memory 304 may comprise suitable logic, circuitry, interfaces, and/or code that may be operable to store the set of instructions, which may be executed by the processor 302. The memory 304 may be further operable to store a FREQUENT and a Fast-FREQUENT solution. The memory 304 may be implemented based on a Random Access Memory (RAM), a Read-Only Memory (ROM), a Hard Disk Drive (HDD), a storage server, and/or a Secure Digital (SD) card.

The transceiver 306 may comprise suitable logic, circuitry, interfaces, and/or code that may be operable to receive one or more resource requests, via the communication network 110. The transceiver 306 may implement known technologies to support wired or wireless communication with the communication network 110. The transceiver 306 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 306 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The resource abstraction engine 308 comprises suitable logic, circuitry, interfaces, and/or code that are operable to perform abstraction of computational resources and create separate types or classes of the one or more computational resources. As discussed above, the requirement translation device 104 may receive information pertaining to the one or more computational resources from the computational resource types 106. The requirement translation device 104 may store the information pertaining to the one or more computational resources in a repository. The repository comprises the one or more shared computational resources of the plurality of computational resource types 106. The resource abstraction engine 308 classifies all similar computational resource types in a particular static class. Such classifications helps in reducing search space. In an embodiment, the resource abstraction engine 308 operates in two phases. The first phase comprises of computational resource type registration and the second phase comprises of performing a dynamic classification of the registered one or more computational resource types.

In the first phase, a resource type owner requires to register the one or more computational resource types with the requirement translation device 104. During registration, the resource owner inputs the one or more computational resource specific information such as, a resource type, an operating system and the like. Examples of resource type comprise a desktop, a laptop, a server, and the like. Examples of operating system comprise Linux, Windows, MAC and the like. The resource abstraction engine 308 is operable to create static classes of one or more computational resources registered in the repository. In the second phase, the resource abstraction engine 308 augments the one or more static classes by dynamic classification based on availability, behavioral pattern data mining, historical performance data of computational resources, and online learning approaches. Based on the static and dynamic classification, the resource abstraction engine 308 generates a resource pool 310 containing the one or more computational resources from the repository.

The resource pool 310 comprises of one or more computational resource, classified into static or dynamic classes by the resource abstraction engine 308. The one or more computational resource in the resource pool 310 are shared computational resources and the resource modeling engine 312 utilizes such computational resource for performing the plurality of tasks.

The resource modeling engine 312 comprises suitable logic, circuitry, interfaces, and/or code that are operable to determine a capacity vector and a capacity unit for each of the one or more computational resource types registered in the repository. The resource modeling engine 312 allocates the capacity unit of a computational resource type to the plurality of tasks for determining the computational resource requirement. In an embodiment, if the capacity unit is less than the required performance demand, then plurality of capacity units are needed to meet plurality of tasks demands. In an embodiment, the resource modeling engine 312 utilizes capacity units of different computational resource types to meet the performance demands of the plurality of tasks.

The task modeling engine 314 comprises suitable logic, circuitry, interfaces, and/or code that are operable to determine a performance of a task on a computational resource type and a cost for performing the task on the computational resource type. Each task $T_j$ is associated with a performance demand Dj. Each task is further associated with two specific parameters comprising a performance value and a cost value. The performance value of the task depends on the type of the computational resources. The task modeling engine 314 in conjunction with the resource modeling engine 312 determines the performance value and the cost of each task for each computational resource type.

The database 316 stores the performance value and the cost associated with each of the plurality of tasks. Based on the output of the task modeling engine 314 and the resource modeling engine 312, the performance value and the cost of each task of each computational resource type is computed. The corresponding values for each computational resource type are stored in the database 316. The database 316 provides the performance and cost values as input to the RRD engine 318.

The RRD engine 318 comprises suitable logic, circuitry, interfaces, and/or code that are operable to translate performance demand of the resource requestor 102 for a task to low-level granularity of computational resource requirements. The RRD engine 318 is operable to ensure that the computational resource requirements cater to the most cost efficient computational resources for a task. The RRD engine 318 is further operable to ensure fairness while creating computational requirements for most cost efficient computational resources pertaining to each task. The RRD engine 318 is further operable to perform ranking of computational resource types for each task. The RRD engine 318 is further operable to convert a list of computational resource stored in the resource pool 310 into N different ranked lists corresponding to N tasks. The RRD engine 318 ranks each of the computational resource types in the ranked list in an increasing order of the cost value for the task.

In operation, the processor 302 registers the plurality of computational resource types 106 within the requirement translation device 104. In an embodiment, the registration further involves sharing of information pertaining to the one or more computational resources associated with the one or more computational resource types 106. In an embodiment, the information may include capacity of the one or more computational resources, IP address of the one or more computational resources, availability of the one or more computational resources, and the like. Post registering of the plurality of computational resource types 106, the resource abstraction engine 308 creates static and dynamic classes for each of the registered plurality of computational resource types 106 and stores the plurality of shared computational resources in the resource pool 310. In an embodiment, the resource abstraction engine 308 creates the static classes and the dynamic classes based on the computational resources of each computational resource type, the availability, and the behavioral pattern mining of the computational resources. In another embodiment, the resource abstraction engine 308 analyzes historical performance of the computational resources to classify the computational resource types. After resource abstraction, the resource modeling engine 312 determines a capacity vector $C(i)$ and a capacity unit $Cu(i)$ of the one or more computational resources associated with each computational resource type.

The transceiver 306 receives the plurality of task requests 202 from the resource requestor 102, via the communication network 110. Each of the plurality of task requests 202 contain computational resource requirement information pertaining to a corresponding task. The computational resource requirement information transmitted by the resource requestor 102 is a high-level granularity of computational resource requirement.

The task modeling engine 314 associates each task with a performance demand $Dj$. Further, each task $Tj$ has an associated a cost for each computational resource type. Consider there are R different types of computational resources $\{r_1, \ldots, r_R\}$ registered in the repository. Each computational resource type is further associated with the capacity vector and the capacity unit. A capacity vector $C(i)< >$ of computational resource type $r_i$ is given by a vector indicative of capacity of the respective computational resource, e.g., compute, memory, and storage. An example of a capacity vector is <2 GHz, 2 CPUs, 2 GB, 100 GB>. The capacity unit $Cu(i)< >$ of a computational resource type ri is defined by the resource modeling engine 312 depending on the granularity of computational resource capacity unit.

The capacity unit of a computational resource type refers to a smallest computational unit capable of contributing to perform a task. In an embodiment, the capacity unit of a computational resource type may be determined by determining the greatest common factor of capacity of each computational resource across all the registered computational resources. For example, if there are two computational resources with capacity vectors <2 GHz, 2 CPUs, 2 GB, 100 GB> and <4 GHz, 1 CPU, 8 GB, 60 GB>, then the capacity unit is <2 GHZ, 1 CPU, 2 GB, 20 GB>. The RRD engine 318 allocates the capacity units to one or more tasks for performing the plurality of tasks. In an embodiment, if the capacity unit is less than the required performance demand, then the RRD engine 318 utilizes plurality of capacity units to meet the tasks' demands. In an embodiment, the RRD engine 318 utilizes capacity units of different types of computational resources to meet the performance demands of the plurality of tasks.

For determining the computational resource requirement for performing the plurality of tasks, the processor 302 provides the performance demand $Dj$ and the cost of each task associated with each corresponding resource type as input to the RRD engine 318. For example, consider a task $Tj$ performed on a computational resource type ri with capacity unit $Cu(i)< >$. The performance value associated with the task $Tj$ is represented as $Pu(j, i)$. $Pu(j, i)$ is the performance value for task $Tj$ on computational resource type ri. The value of $Pu(j, i)$ is stored in the database 316. Similarly, a cost $Eu(j, i)$ associated with a task $Tj$ on capacity unit of each computational resource type ri is also stored in the database 316.

In response to the input, the processor 302 in conjunction with the RRD engine 318 performs ranking of the plurality of computational resource types 106 based on the cost. In an embodiment, the RRD engine 318 considers benchmarking information and/or historical performance of each of the computational resource types for ranking the plurality of computational resource types 106 for performing a task. Based on the ranking of the plurality of the computational resource types 106, the processor 302 in conjunction with the RRD engine 318 allocates the one or more capacity units of the one or more computational resources of a computational resource type to the plurality of tasks. The RRD engine 318 is operable to ensure fairness in allocation of capacity units of a computational resource type to a task. In order to ensure fairness in allocation of capacity units of a computational resource type to a task, the RRD engine 318 utilizes of either a FREQUENT heuristic solution or a Fast-FREQUENT heuristic solution. The detailed working of the FREQUENT heuristic solution and the Fast-FREQUENT heuristic solution is explained in FIG. 4 and FIG. 6. Based on the allocation of the one or more capacity units of a computational resource type using either the FREQUENT heuristic solution or the Fast-FREQUENT heuristic solution, the RRD engine 318 generates an output of the low-level granularity of computational resource requirement.

Consider a scenario wherein the user of the resource requestor 102 provides an input of high-level granularity computational resource requirement for performing two tasks using a user interface. In addition, the number of shared computational resource types is two. The requirement translation device 104 determines the capacity vector for each of the computational resource type. Further, the requirement translation device 104 determines a capacity unit of each computational resource type, which can be used for allocation to the two tasks. The requirement translation device 104 ranks each computational resource type based on a cost associated with each computational resource type corresponding to each task. In an embodiment, the user is provided a user interface where the user can select an option of high performance or high fairness. Based on the option selected by the user, the requirement translation device 104 allocates one or more capacity units to satisfy the performance demand for each of the two tasks.

Figure 4:
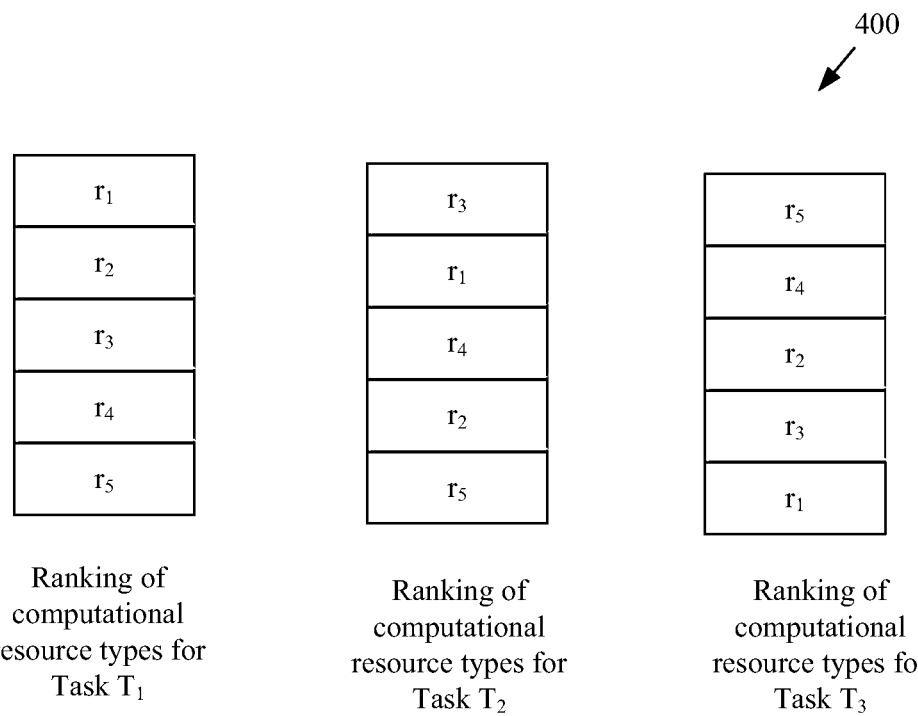
FIG. 4 is a block diagram illustrating ranking of computational resource types for task T1, task T2, and task T3, respectively, in accordance with an embodiment of the disclosure.

FIG. 4 is a block diagram 400 illustrating ranking of computational resource types for task T1, task T2, and task T3, respectively, in accordance with an embodiment of the disclosure. FIG. 4 is explained in conjunction with elements from FIG. 1, FIG. 2, and FIG. 3. With reference to FIG. 4, there is shown a task T1, a task T2, a task T3. The computational resource types r1, r2, r3, r4, and r5 are used for allocation to each of the task T1, task T2, and task T3.

For task T1, the processor 302 in conjunction with the RRD engine 318 ranks and sorts the computational resource types r1, r2, r3, r4, and r5 in an ascending order. The processor 302 performs ranking such that the first ranked computational resource type has lowest cost for the task T1. For example, for task T1, computational resource type r1 has the lowest cost, and thus computational resource type r1 is placed in the first rank for task T1. However, the same computational resource type, r1, gets a second rank and a fifth rank for the task T2 and task T3, respectively. For task T1, the computational resource type r2, r3, r4 and r5 get a second rank, at third rank, a fourth rank and a fifth rank, respectively. The computational resource type r2 gets a fourth rank and a third rank for the task T2 and task T3, respectively. The computational resource type r3 gets a first rank and a fourth rank for the task T2 and task T3, respectively. The computational resource type r4 gets a third rank and a second rank for the task T2 and task T3, respectively. The computational resource type r5, gets a fifth rank and a first rank for the task T2 and task T3, respectively.

A person having ordinary skill in the art would understand that the scope of the disclosure is not limited to ranking the computational resource types based on the cost of the one or more computational resources associated with said one or more computational resource types. In an embodiment, the computational resource types may be ranked based on the performance.

An index variable k(j) is used to index the computational resource types in the ranked lists. Where j corresponds to $j^{th}$ task. For a given task T1, k(1) gets the value of the ranking index of a computational resource type for the task T1, i.e. $1 \leq k(j) \leq R$, where R is the number of computational resource types. For example, as shown in FIG. 3, the number of computational resource type R is 5. Thus, k(1), k(2), and k(3) each get a value between 1 to 5. However, same values of the index may point to two different computational resource types depending on the ranking list. For example, k(1)=1 points to computational resource type r1 in the ranked list. Therefore, for task '1', the resource type r1 is ranked the highest. Similarly, k(2)=1 point to computational resource type r3 in the ranked list. Similarly, k(3)=1 point to computational resource type r5 in the ranked list.

Based on the ranking of the computational resource types, RRD engine 318 allocates the one or more computational resources to the plurality of tasks. The RRD engine 318 ensures that a fair allocation of one or more computational resources is achieved to perform the plurality of tasks. The RRD engine 318 performs fair allocation of one or more computational resources using either one of Fair REQUest gENeraTion (FREQUENT) heuristic solution or Fast-Fair REQUest gENeraTion (Fast-FREQUENT) heuristic solution. Based on the allocation of the one or more computational resources, the RRD engine 318 provides an output of the low-level computational resource requirement.

The RRD engine 318 is operable to create a fair computational resource requirement in such a manner that the best computational resource type for a task is a part of the computational resource requirement. The best computational resource type for the task corresponds to a highest ranked computational resource type in the ranking list. The RRD engine 318 is operable to determine a task fairness metric f(j) for task Tj. The task fairness metric is defined as below by the equation 1.

$$f(j) = \Sigma_{k(j)=1}^{k(j)=R} \{a_{k(j)}(R-k(j)+1)\} \qquad \text{Equation 1:}$$

where k(j) is index to a list of one or more computational resource types sorted in an ascending order of cost Eu(j, k(j)), i.e., Eu(j, 1)<Eu(j, 2)< ... <Eu(j, R); and a_(k(j)) is the number of capacity units of computational resource type r_(k(j)) considered to be required for task Tj.

For example, if the computational resource requirement for task T1 as shown in FIG. 3 is that there are 10, 15, 20, 0, and 5 capacity units of r1, r2, r3, r4, and r5 computational resource types, respectively. Thus, as per the task fairness definition f(1)=10*(5−1+1)+15*(5−2+1)+20*(5−3+1)+0*(5−4+1)+5*(5−5+1)=50+60+60+0+5=175. If, however, the number of capacity units for computational resource types relating to lower indexed elements in the ranked list is increased (and capacity units from other elements decreased consequently), the fairness metric value will increase. For example, if the capacity unit of 10 is increased to 15 and the capacity unit of 15 is decreased to 10, then the value of f(1) would become 180.

It is to be understood by a person skilled in the art that the order of computational resource types in the aforementioned ranked list based on the cost can be different for different tasks since the cost of the computational resource type varies from one task to another task.

The task fairness metric as defined above in equation 1 takes a high value when the RRD engine 318 inserts cost efficient computational resources (i.e., computational resources with lower index in the ranked list for a task) for each task as a part of the computational resource requirement. Similarly, the task fairness metric takes a low value if the RRD engine 318 cannot insert cost efficient computational resources as a part of corresponding task's computational resource requirement. In an ideal scenario, the RRD engine 318 is able to create the computational resource requirement such that the task fairness metric values for all the tasks are as high as possible. In such a scenario, the RRD engine 318 of the requirement translation device 104 is said to be fair. The requirement translation device fairness metric is defined as the average of fairness of each task request received by the requirement translation device 104. The equation 2 as shown below represents the requirement translation device fairness metric F.

$$F = \frac{\sum_{j=1}^{j=N} f(j)}{N}$$ Equation 2 where

N is the total number of tasks in the system.

Figure 5A:
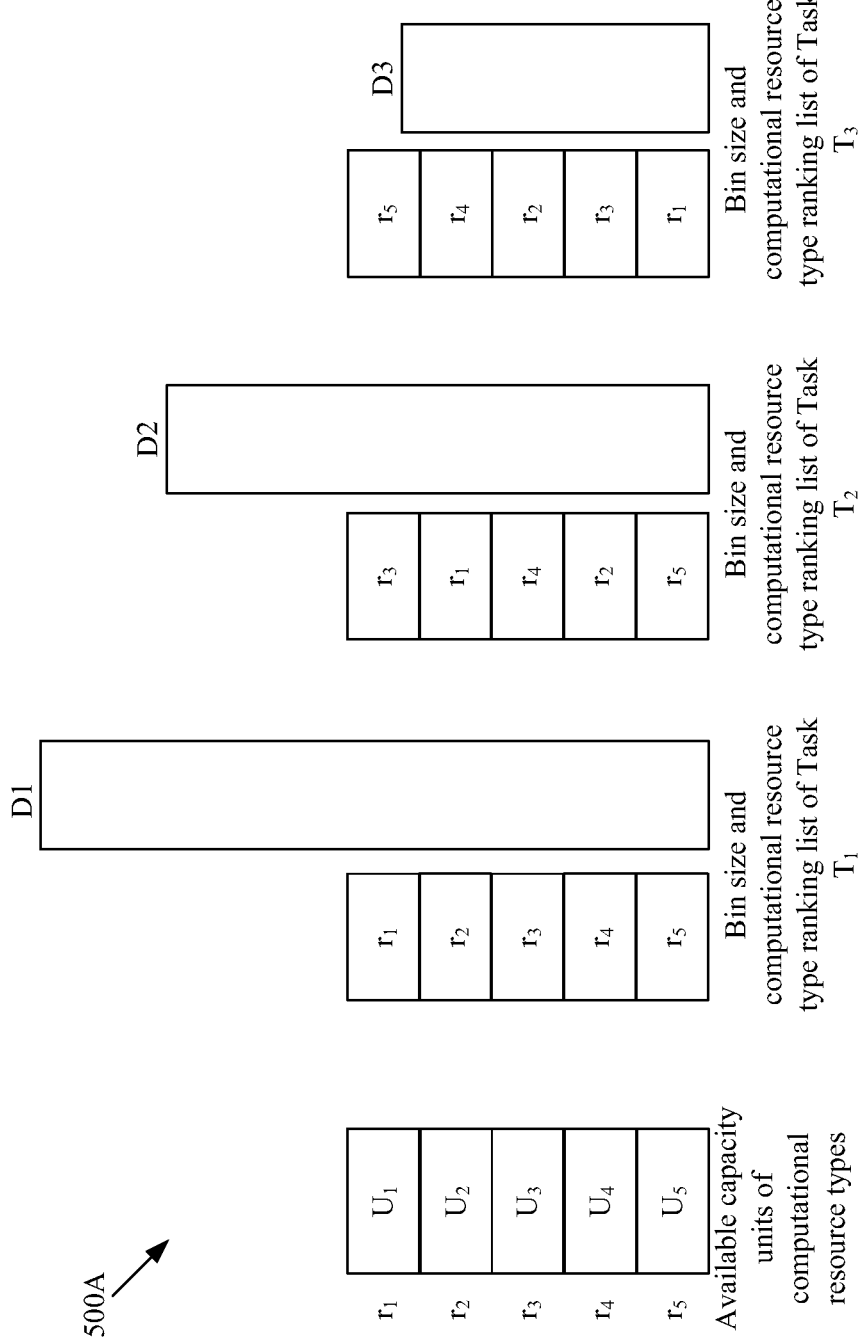
FIG. 5A is a diagram illustrating an initial state (Input) to a Bin Packing Heuristics, in accordance with an embodiment of the disclosure.
Figure 5B:
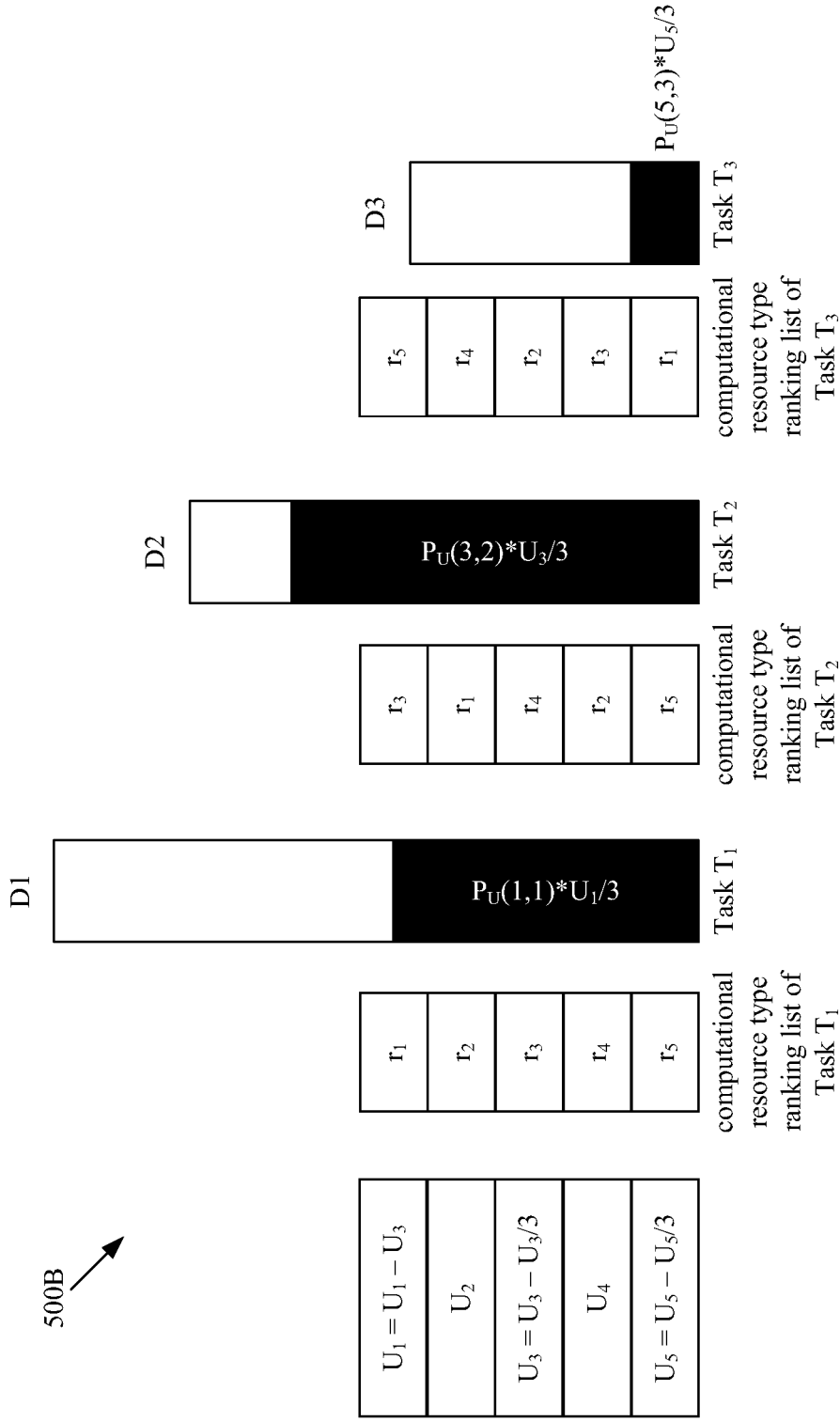
FIG. 5B is a diagram illustrating a FREQUENT heuristic solution for allocation of capacity units, associated with a computational resource, to one or more tasks, in accordance with an embodiment of the disclosure.

The RRD engine 318 is operable to create a computational resource requirement for the plurality of tasks to match the tasks' performance demands while being fair to the plurality of tasks in cost efficiency of the computational resource requirements. Thus, the RRD engine 318 must maximize F to ensure that the performance demands of the plurality of tasks are met in a fair manner. Equation 3 represents maximization of F to meet the performance demands of the plurality of tasks.

$$\sum_{k(j)=1}^{k(j)=R} \{a_{k(j)} P_u(j,k(j))\} \leq D_i$$

$$\forall Tj \in \{T_1, T_2, \ldots, T_N\}$$ Equation 3:

FIG. 5A and FIG. 5B are block diagrams 500A and 500B illustrating an initial state (Input) to a Bin Packing Heuristics and a Fair REQUest gENeraTion (FREQUENT) heuristic solution for allocation of capacity units, associated with a computational resource type, to one or more tasks, respectively, in accordance with an embodiment of the disclosure.

In an embodiment, the maximization of fairness F can be cast as a bin packaging problem where the performance demand of each task is represented by size of bin bags and each item in the bin bag corresponds to a capacity unit of a computational resource type from each of N different computational resource types. The RRD engine 318 is operable to determine the number of capacity units for each computational resource type to fill up the bin bag (i.e., to meet the performance demands). Both the heuristic solutions start with an initial state as shown in FIG. 5A. In order to maximize F, the input required is, the performance demand for each task i.e. the bin size, the ranking list for each task, and the capacity units available for each computational resource type. The heuristic solutions determine the number of capacity units of each computational resource types required to fill the bins i.e. to meet performance demands while trying to maximize the fairness F.

FIG. 5B shows the FREQUENT heuristic solution for allocation of capacity units of one or more computational resources, associated with a computational resource type, to one or more tasks. For the FREQUENT heuristic solution, in the first step, the processor 302 iterates over all the tasks, i.e., the number of bins. Based on the available capacity units of the best computational resource type (determined based on the rank of each computational resource type for the respective tasks) for each task, the processor 302 partially fills up the bins for each of the one or more tasks. In an embodiment, the processor 302 may allocate at least one capacity unit of the one or more computational resources of the best available computational resource type for the task. The best computational resource type for each task is the computational resource type with the lowest index in the ranked list. In an embodiment, the best computational resource type for one task may also be the best computational resource type for another task. For example, for task $T_1$, the processor 302 may check if the capacity unit of computational resources of type $r_1$ available. If the capacity unit is available, the processor 302 may allocate a capacity unit of the resource type $r_1$ to the task $T_1$. If the capacity unit of resource type $r_1$ is not available, the processor 302 checks the availability of the capacity unit of next best resource type, i.e., $r_2$.

Post allocation of the capacity unit for the task $T_1$, the processor 302 repeats the same for the task $T_2$ and $T_3$ to allocate the capacity unit to the task $T_2$ and $T_3$. The processor 302 reiterates allocation of the capacity units until the performance demands D1, D2 and D3 corresponding to each task $T_1$, $T_2$ and $T_3$ are met.

In an embodiment, the processor 302 may further define an upper limit for the maximum number of capacity units that are allocable to a task from a particular resource type. In an embodiment, the maximum number of capacity units may be configured as $$\lceil \frac{u_i}{N} \rceil$$

for each task, where $u_i$ is the available capacity units of computational resource type i, and i is the best computational resource type. Therefore, while checking for the availability for the capacity unit of a computational resource type, the processor 302 may further check if the number of capacity units previously allocated to the task is greater or equal to the upper limit. In an embodiment, the processor 302 determines that the maximum number of capacity units is greater than the upper limit. In such an embodiment, the processor 302 may consider the computational resource type to be unavailable and may consider the allocation of the capacity unit from the next best computational resource type.

For the FREQUENT heuristic solution, as the all the capacity units of a particular computational resource type is not allocated to a particular task, therefore, fairness is maintained. Before filling the bin, the processor 302 converts the capacity units to the performance value by multiplying with the capacity unit with the performance value of the task on the computational resource type. Thereafter, for each task, the processor 302 may assign one capacity unit (consuming unit performance space in the bin bag for the task) of one or more computational resources of a best computational resource type for the task under consideration. Thereafter, the processor 302 repeats the same for the remaining tasks. Thus, in a worst-case scenario, equal number of capacity units are available to all the tasks, when the same computational resource type is the best computational resource type for all the tasks.

FIG. 5B shows the allocation of capacity units in an iterative manner for task T1, task T2, and task T3 having performance demands D1, D2, and D3, respectively, based on the FREQUENT heuristic solution. The ranking list for task T1, task T2, and task T3 is as shown in FIG. 3. Based on the ranking list, $r_1$, $r_3$, and $r_5$ are the best computational resource types for the tasks $T_1$, $T_2$, and $T_3$, respectively. Thus, in the first iteration, the processor 302 in conjunction with the RRD engine 318 allocates the capacity units for the respective tasks and the corresponding tasks are filled by the performances value of the tasks on the computational resource types. After the first iteration, the bins are not filled completely. Thus, the capacity units of the best available computational resource type are allocated iteratively until the bins are full, i.e., the performance demand of each respective task is met. After the allocation of the capacity unit for each task, the processor 302 updates the available capacity units for allocation for the computational resource type. After the iteration for all tasks is complete, there are two possible scenarios. In first scenario, the best respective computational resource type of each task fills all the bins. In second scenario, the bins are partially filled and the performance demands D1, D2, and D3 for each of the tasks T1, T2 and T3 are not met. In case if a second scenario exists, iteratively allocation of the best available computational resource type is performed. In an embodiment, if after the first iteration, the best computational resource for a task is exhausted, then the next best computational resource type in the ranked list is used for allocation. The processor 302 repeats the iterations over all the tasks until all the bins are filled, i.e., the performance demands D1, D2, and D3 for each of the tasks T1, T2 and T3 are met. The time complexity for an iteration over all the tasks is O(N). For each task, the ranked list of computational resource type is iterated yielding a time complexity of O(NR). Since each iteration can further be repeated O(N) times to fill up the bins at the worst case, the overall worst case complexity of FREQUENT heuristic solution is $O(N^2R)$.

Based on the count and the type allocated capacity units, the processor 302 may determine the computational resource requirement for each of the one or more tasks. For example, the number of capacity units allocated to the task-1 are three capacity units of resource type r1 and one capacity unit of resource type r2. If the capacity vector of the capacity unit is <500 MHz, 1 GB RAM, and 20 GB HDD>, the resource requirement of the task-1 is <1.5 GHz, 3 GB RAM, and 60 GB HDD> of resource type r1 and <500 MHz, 1 GB RAM, and 20 GB HDD> of resource type r2.

Figure 6:
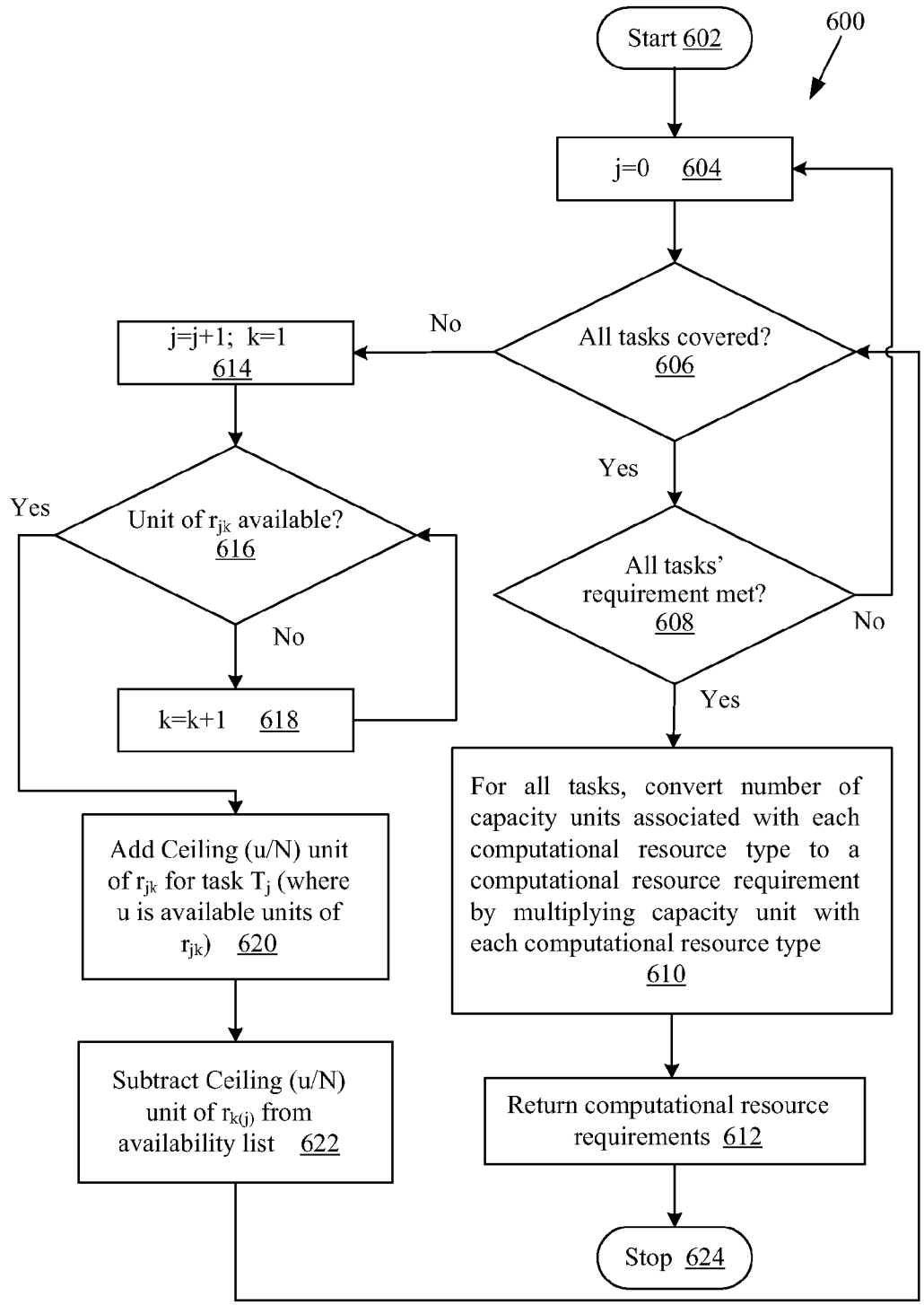
FIG. 6 is a flow diagram illustrating a FREQUENT heuristic solution for allocation of capacity units, associated with a computational resource, to one or more tasks, in accordance with an embodiment of the disclosure.

FIG. 6 is a flow diagram 600 illustrating a FREQUENT heuristic solution for allocation of capacity units, associated with a computational resource type, to one or more tasks, in accordance with an embodiment of the disclosure. The method starts at step 602 and proceeds to step 604. At step 604, for processor 302 initiates j=0 to determine the number of tasks and proceeds to step 606, where j corresponds to $j^{th}$ task from the plurality of tasks requests. At step 606, the processor 302 determines whether all tasks are covered or not. When all tasks are covered, the method proceeds to step 608. When all tasks are not covered method proceeds to step 614. At step 608, the processor 302 determines whether all the task requirements are met. When the task requirements are met, then method proceeds to step 610. When the task requirements are not met, then the method proceeds to step 604. At step 610, the processor 302 converts number of capacity units associated with each computational resource type for all tasks to a computational resource requirement by multiplying the capacity unit with each computational resource type. At step 612, based on the conversion performed by the processor 302, the computational resource requirement for performing the tasks is provided as an output, and the method proceeds to end step 624. At step 614, the processor 302 increments the task number j by 1 and selects the computational resource type with index k=1 in the ranked list. At step 616, the processor 302 whether capacity unit of computational resource type $r_{jk}$ is available or not. When the capacity units are not available then the method proceeds to step 618. When the capacity units are available, the method proceeds to step 520. At step 618, the index k for the computational resource type in the ranked list is incremented by 1 and then method proceeds to step 616. At step 620, the processor 302 adds u/N capacity units of $r_{jk}$ for task $T_j$, where u is the available capacity units of $r_{jk}$. At step 622, the processor 302 subtracts u/N capacity units of $r_{k(j)}$ from the availability list and the method proceeds to step 606.

Figure 7:
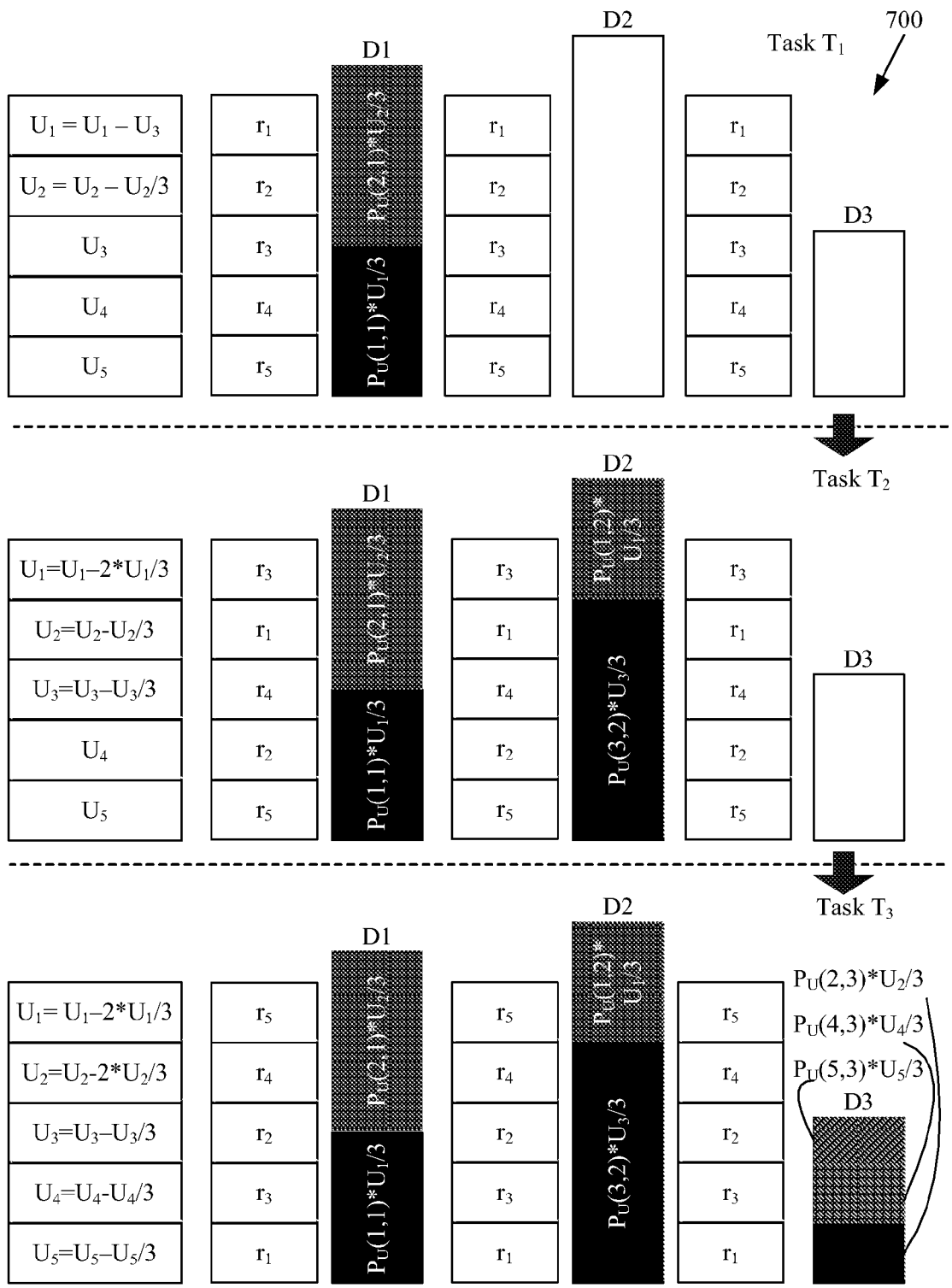
FIG. 7 is a diagram illustrating a Fast-FREQUENT heuristic solution for allocation of capacity units, associated with a computational resource, to one or more tasks, in accordance with an embodiment of the disclosure.

FIG. 7 is a block diagram 700 illustrating a Fast-Fair REQUest gENeraTion (Fast-FREQUENT) heuristic solution for allocation of capacity units, associated with a computational resource type, to one or more tasks, in accordance with an embodiment of the disclosure. For the Fast-FREQUENT heuristic solution, the processor 302 fills a bin corresponding to a task T1 in one instance. When the processor 302 fills the bin corresponding to the task T1, then the processor 302 fills the bin for the task T2. Similarly, when the processor 302 fills the bin corresponding to the task T2, then the processor 302 fills the bin for the task T3. Thus, for each task, Fast-FREQUENT iterates over the list of ranked computational resource types and assigns $$\lceil \frac{u_i}{N} \rceil$$

capacity units of each computational resource type until the corresponding bin is filled completely. In an embodiment, the processor 302 fills the bin without iterating over all the computational resource types and thus the iteration of computational resource types is stopped. FIG. 7 illustrates the Fast-FREQUENT solution using the three tasks T1, T2, and T3 and the five computational resource types r1, r2, r3, r4, and r5 shown in FIG. 3. For Task $T_1$, since $r_1$ and $r_2$ are the best and next best computational resource types, respectively, Fast-FREQUENT allocates the capacity units of r1 and r2 computational resource types for the task T1 and stops there since the bin gets full. Similarly, for task $T_2$, Fast-FREQUENT allocates the computational resource type $r_3$ first followed by computational resource type $r_1$ to fill the bin corresponding to task T2. The order of computational resource types to be allocated for a task is determined by the ranking of the computational resource types as shown in FIG. 4. For task $T_3$, Fast-FREQUENT allocates three computational resource types again based on the ranking for the task as per FIG. 4.

The processor 302 determines an exact portion of the bin by multiplying the capacity unit with the performance of the task on the computational resource type. The time complexity of Fast-FREQUENT heuristic solution is O(NR) and thus is faster than FREQUENT heuristic. However, Fast-FREQUENT heuristic solution leads to sub-optimal fairness when compared to FREQUENT heuristic solution. For example, although the best computational resource type r1 capacity units are available, but the Fast-FRQUENT heuristic solution fails to allocate the computational resource type r1 capacity units for the task $T_1$. This is because Fast-FREQUENT heuristic solution greedily fills up the bins in one instance. In such an instance, since enough many other tasks do not use computational resource type r1, the Fast-FREQUENT heuristic solution leads to a sub-optimal computational resource requirement generation. However, such a situation cannot occur in FREQUENT heuristic solution which, has higher complexity and thus less scalable. Thus, the FREQUENT heuristic solution ensures higher fairness as compared to that of Fast-FREQUENT heuristic solution and the Fast-FRQUENT heuristic solution ensures high performance as compared with the FREQUENT heuristic solution.

In an embodiment, an option may be provided to the user of the resource requestor 102 to select for high performance or high fairness. Accordingly, the processor 302 selects the Fast-FREQUENT heuristic solution or the FREQUENT heuristic solution for generating the computational resource requirement for performing a task.

Figure 8:
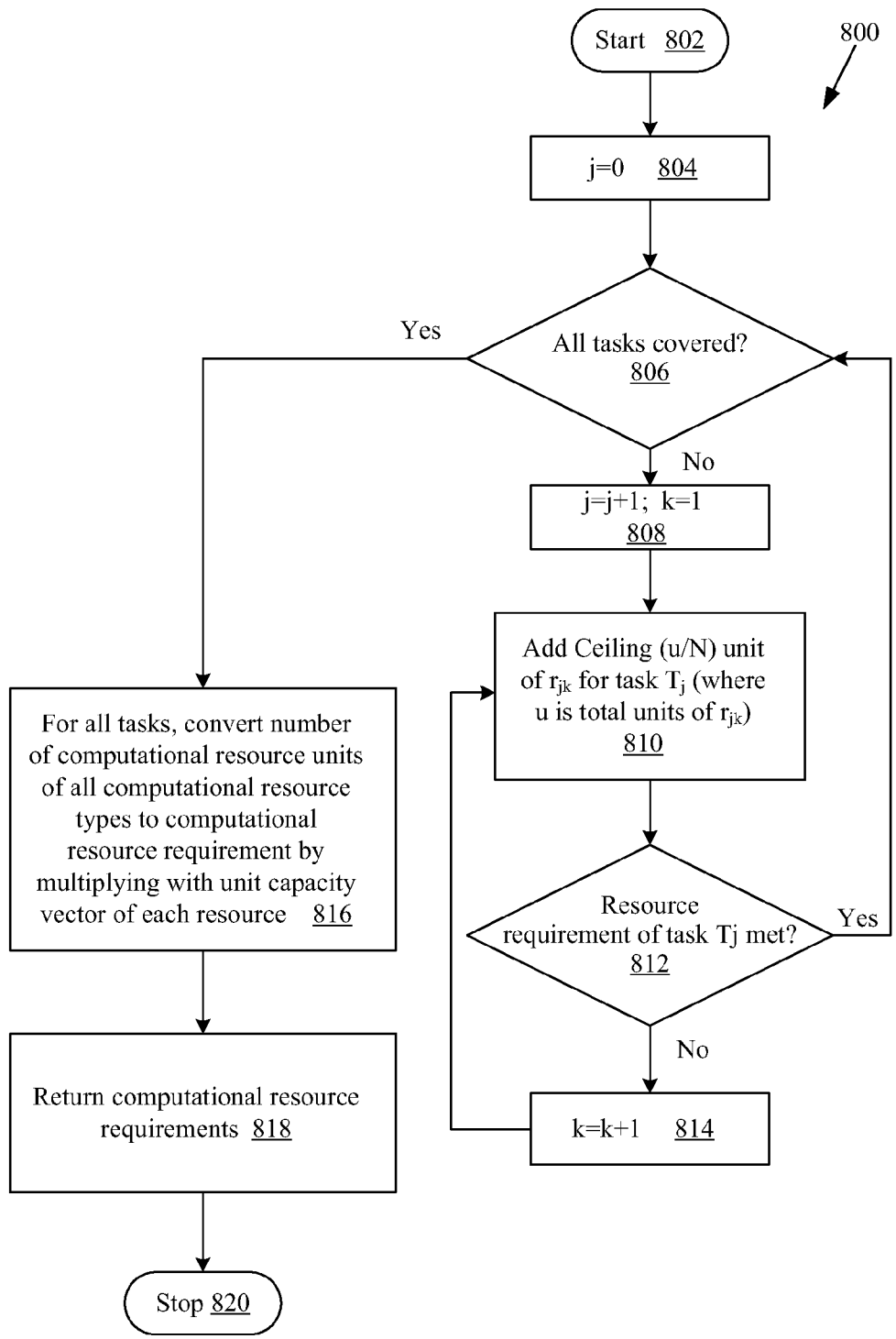
FIG. 8 is a flow diagram illustrating a Fast-FREQUENT heuristic solution for allocation of capacity units, associated with a computational resource, to one or more tasks, in accordance with an embodiment of the disclosure.

FIG. 8 is a flow diagram 800 illustrating a Fast-FREQUENT heuristic solution for allocation of capacity units, associated with a computational resource type, to one or more tasks, in accordance with an embodiment of the disclosure. The method starts at step 802 and proceeds to step 804. At step 804, for processor 302 initiates j=0 to determine the number of tasks and proceeds to step 806, where j corresponds to $j^{th}$ task from the plurality of tasks requests. At step 806, the processor 302 determines whether all tasks are covered or not. When all tasks are covered, the method proceeds to step 816. When all tasks are not covered method proceeds to step 808. At step 816, the processor 302 converts number of capacity units associated with each computational resource type for all tasks to a computational resource requirement by multiplying the capacity unit with each computational resource type. At step 818, based on the conversion performed by the processor 302, the computational resource requirement for performing the plurality of tasks is provided as an output, and the method proceeds to end step 820. At step 808, the processor 302 increments the task number j by 1 and selects the computational resource type with index k=1 in the ranked list. At step 810, the processor 302 adds u/N capacity units of $r_{jk}$ for task $T_j$, where u is the available capacity units of $r_{jk}$. At step 812, the processor 302 determines whether the computational resource requirement for task $T_j$ is met or not. When the computational resource requirement for task $T_j$ is met, then the method proceeds to step 806. When the computational resource requirement for task $T_j$ is not met, then the method proceeds to step 814. At step 814, the index k for the computational resource type in the ranked list is incremented by 1 and the method proceeds to step 810.

Various embodiments of the disclosure may provide a non-transitory computer readable medium and/or storage medium, and/or a non-transitory machine-readable medium and/or storage medium having stored thereon, a machine code and/or a computer program having at least one code section executable by a machine and/or a computer for projecting content. The at least one code section in an electronic device may cause the machine and/or computer to perform the steps, which may comprise registering a plurality of computational resources with one or more computational resource types in a repository, wherein each of the plurality of computational resources are associated with a capacity vector. A capacity unit for each of the one or more computational resource types is determined based on the capacity vector. Receiving a request for determining a computational resource requirement for performing plurality of tasks based on a pre-defined performance demand associated with each of the plurality tasks. Ranking one or more computational resource types for each of the one or more tasks in an ascending order, based on the cost associated with the one or more tasks for each of the computational resource type. Allocating the one or more capacity units required to compute the one or more tasks based on the ranked one or more computational resources and a fairness metric, wherein the fairness metric ensures that allocation of the one or more capacity units to the one or more tasks is performed in a manner to maximize the fairness. Determining the computational resource requirement to perform the plurality of tasks based on the allocated one or more capacity units.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code, or notation; b) reproduction in a different material form.

Various embodiments of the methods and systems for allocation of computational resources distributed computing network have been disclosed. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for allocating computational resources to a plurality of tasks, the method comprising:
   ranking one or more computational resource types for each of the plurality of tasks, based on at least a cost of a capacity unit of each of the one or more computational resources associated with each of the one or more computational resource types, wherein the capacity unit of each of the one or more computational resources is determined based on a greatest common factor of computational speed and storage capacities of the one or more computational resources;
   allocating, to each of the plurality of tasks, the capacity unit of the one or more computational resources associated with a computational resource type, from the respective one or more ranked computational resource types based on a fairness metric for each of the plurality of tasks and a rank of the computational resource type, until a pre-defined performance demand of each of the plurality of tasks is met, wherein the fairness metric is based on a number of capacity units associated with corresponding indices of the one or more ranked computational resource types; and
   executing each of the plurality of tasks on one or more computational resources having the allocated capacity units.

2. The method of claim 1, further comprising receiving information pertaining to the one or more computational resources from the one or more computational resource types.

3. The method of claim 2, wherein the information comprises an IP address of the computational resource type, and computational speed and storage capacity of each of the one or more computational resources.

4. The method of dam 1, further comprising determining a number of capacity units required for performing plurality of tasks based on said allocation.

5. The method of dam 1, further comprising determining a performance value of each of the plurality of tasks by utilizing one or more benchmarking techniques.

6. The method of claim 1, further comprising determining the cost for each of the one or more computational resources associated with each of the one or more computational resource types by utilizing one or more benchmarking techniques.

7. The method of claim 6, wherein the cost comprises at least a network/bandwidth cost associated with the respective computational resource.

8. The method of claim 1, further comprising determining an upper limit of a number of capacity units, allocable to a task from the one or more tasks, for each of the one or more computational resource types, based on at least a number of the one or more tasks.

9. The method of claim 1, further comprising determining a computational resource requirement of each of the plurality of tasks based on a count of capacity units allocated to each of the plurality of tasks.

10. A computer program product for allocating computational resources to a plurality of tasks, the computer program product comprising:
   a non-transitory computer readable medium having stored thereon instructions causing a computer to perform steps comprising:
      ranking one or more computational resource types for each of the plurality of tasks, based on at least a cost of each of the one or more computational resources associated with each of the one or more computational resource types, wherein the capacity unit of each of the one or more computational resources is determined based on a greatest common factor of computational speed and storage capacities of the one or more computational resources;
      allocating, iteratively to a task from the plurality of tasks, a capacity unit of one of the one or more computational resources associated with a computational resource type, from the respective one or more ranked computational resource types based on a fairness metric for each of the plurality of tasks and a rank of the computational resource type, until a performance demand of the task is met, wherein the fairness metric is based on a number of capacity units associated with corresponding indices of the one or more ranked computational resource types; and
      executing each of the plurality of tasks on one or more computational resources having the allocated capacity units.

11. The method of claim 10, further comprising determining a number of capacity units required for performing plurality of tasks based on said allocation.

12. The method of claim 10, further comprising determining an upper limit of a number of capacity units, allocable to a task from the one or more tasks, for each of the one or more computational resources types, based on at least a number of the one or more tasks.

13. The method of claim 10, further comprising determining a computational resource requirement of each of the plurality of tasks based on a count of capacity units allocated to each of the plurality of tasks.

14. A method to determine a computational resource requirement, the method comprising:
   registering a plurality of computational resources with one or more computational resource types in a repository, wherein each of the plurality of computational resources are associated with computational speed and storage capacity;
   determining a capacity unit for each of the one or more computational resource types based on the computational speed and storage capacity;
   receiving a request for determining a computational resource requirement for performing plurality of tasks based on a pre-defined performance demand associated with each of the plurality of tasks;
   ranking one or more computational resource types for each of the plurality of tasks in an ascending order, based on a cost associated with the plurality of tasks for each of the computational resources associated with each of the one or more computational resource types, wherein the capacity unit of each of the one or more computational resources is determined based on a greatest common factor of computational speed and storage capacities of the one or more computational resources;
   allocating the one or more capacity units required to perform the plurality of tasks based on the ranked one or more computational resources types and a fairness metric for each of the plurality of tasks, wherein the fairness metric ensures that allocation of the one or more capacity units to the plurality of tasks is performed in a manner to maximize a fairness, wherein the fairness metric is based on a number of capacity units associated with corresponding indices of the one or more ranked computational resource types;

determining the computational resource requirement to perform the plurality of tasks based on the allocated one or more capacity units; and executing each of the plurality of tasks on one or more computational resources having the allocated capacity units.

15. A system to allocate computational resources to plurality of tasks, the system comprising:

one or more processors operable to:

rank one or more computational resource types for each of the plurality of tasks, based on at least a cost of a capacity unit associated with each of the one or more computational resources associated with each of the one or more computational resource types, wherein the capacity unit of each of the one or more computational resources is determined based on a greatest common factor of computational speed and storage capacities of the one or more computational resources; and allocate to each of the plurality of tasks, the capacity unit of one of the one or more computational resources associated with a computational resource type, from the respective one or more ranked computational resource types based on a fairness metric for each of the plurality of tasks and a rank of the computational resource type, until a pre-defined performance demand of each of the plurality of tasks is met, wherein the fairness metric is based on a number of capacity units associated with corresponding indices of the one or more ranked computational resource types; and execute each of the plurality of tasks on one or more computational resources having the allocated capacity units.

16. The system of claim 15, wherein one or more processors are operable to determine a number of capacity units required for performing plurality of tasks based on said allocation.

17. The system of claim 15, wherein one or more processors are operable to determine an upper limit of a number of capacity units, allocable to a task from the one or more tasks, for each of the one or more computational resource types, based on at least a number of the one or more tasks.

18. The system of claim 15, wherein one or more processors are operable to determine a computational resource requirement of each of the plurality of tasks based on a count of capacity units allocated to each of the plurality of tasks.

19. A computer program product for allocating computational resources to plurality of tasks, the computer program product comprising:

a non-transitory computer readable medium having stored thereon instructions causing a computer to perform steps comprising:

ranking one or more computational resource types for each of the plurality of tasks, based on at least a cost of each of the one or more computational resources for each of the plurality of tasks, wherein the capacity unit of each of the one or more computational resources is determined based on a greatest common factor of computational speed and storage capacities of the one or more computational resources; and allocating, iteratively to a task from the plurality of tasks, a capacity unit of one of the one or more computational resources associated with a computational resource type, from the respective one or more ranked computational resource types based on a fairness metric for each of the plurality of tasks and a rank of the computational resource type, until a performance demand of the task is met, wherein the fairness metric is based on a number of capacity units associated with corresponding indices of the one or more ranked computational resource types; and executing each of the plurality of tasks on one or more computational resources having the allocated capacity units.

20. The system of claim 19, wherein one or more processors are operable to determine a number of capacity units required for performing plurality of tasks based on said allocation.

21. The system of claim 19, wherein one or more processors are operable to determine an upper limit of a number of capacity units, allocable to a task from the one or more tasks, for each of the one or more computational resource types, based on at least a number of the one or more tasks.

22. The system of claim 19, wherein one or more processors are operable to determine a computational resource requirement of each of the plurality of tasks based on a count of capacity units allocated to each of the plurality of tasks.

* * * * *